United States Patent [19]

Wright

[11] 4,063,627
[45] Dec. 20, 1977

[54] PNEUMATIC CONTROL SYSTEM FOR A PRESS

[75] Inventor: Donald R. Wright, Cheviot, Ohio

[73] Assignee: Textron, Inc., Providence, R.I.

[21] Appl. No.: 740,768

[22] Filed: Nov. 10, 1976

[51] Int. Cl.² ............................................. F16D 9/00
[52] U.S. Cl. .................................. 192/131 R; 91/355; 60/407
[58] Field of Search ........... 192/129 R, 129 B, 131 R; 91/355; 60/370, 403, 407, 409

[56] References Cited

U.S. PATENT DOCUMENTS

| | | | |
|---|---|---|---|
| 2,344,763 | 3/1944 | Yanchenko | 192/131 R |
| 3,446,985 | 5/1969 | Carlisle et al. | 192/131 R X |
| 4,026,204 | 5/1977 | Good | 192/131 R X |

Primary Examiner—Edgar W. Geoghegan
Attorney, Agent, or Firm—James W. Pearce; Roy F. Schaeperklaus

[57] ABSTRACT

A pneumatic control system for a press which includes a pair of start switches. The system is constructed so that the press can only be started if both of the start switches are actuated within a predetermined time interval. If one of the start switches is released during a down stroke of the press, the press is stopped. A cam operated switch permits continued operation of the press after the press has reached its bottom position even though start switches are released after the press has passed full down position. A brake cam operated switch prevents operation of the press if the press fails to stop at its full up position.

10 Claims, 24 Drawing Figures

PNEUMATIC CONTROL SYSTEM FOR A PRESS

This invention relates to a pneumatic control system. More particularly, this invention relates to a pneumatic system for controlling the operation of a punch press or the like to eliminate opportunities for injury to the person using it.

Psychologically, operators of such dangerous machinery, such as a punch press, become too familiar with their work and begin to take chances which can lead to injury. Also, the operator may become confused because of time and speed factors, or even distracted, also leading to injury. The pneumatic safety control system limits the operators choices, and requires a supervisor to be closely involved with the operator and the machine. The safety control system achieves these ends in the logic of the pneumatic program and control system, as well as in the physical arrangement, location and types of control devices.

Therefore, an object of this invention is to provide a pneumatic control system for a press machine in which a supervisor has key control so that no one can operate or change the mode of operation of the punch press without his key control.

Another object of this invention is to provide such a system in which mode selection and override choices are made by the supervisor.

A further object of this invention is to provide such a system in which the operator uses two start buttons that have to be pressed substantially simultaneously and which require use of both of the operator's hands.

A further object of this invention is to provide such a system which requires a positive and continuous start command by the operator until the punch press has reached its full down or closed position.

A further object of this invention is to provide such a system in which both start buttons must be pressed throughout a down stroke of the machine and in which the machine is stopped and remains in stopped position if one of the start buttons is released during a down stroke until released by the supervisor.

Another object of this invention is to provide such a system which limits the punch press to one cycle at a time, requiring a new start signal for each cycle.

Another object of this invention is to provide the operator with a readily available emergency stop function that will stop the press in any mode at any position.

Another object of this invention is to prevent unannounced start-ups, and to provide a control system in which all starts have to be a product of a series of deliberate actions and choices.

A further object of this invention is to provide such a system which monitors the brake or stopping ability of the press machine and shuts down the press machine when repair or override is necessary so that the press can be restarted only after a supervisory decision.

A further object of this invention is to provide such a system which has features so that when a failure occurs, the system will stop the punch press.

Briefly, this invention provides an air logic program that can be mounted upon a punch press or the like and by means of human and mechanical input will operate brake and clutch members of the punch press in a controlled and safe manner. Supervisory personnel are supplied with key control to be used in conjunction with a main control panel that makes it impossible for the operator to change the operating mode of the press, or reset it after an improper stop without key action by the supervisory personnel. The operator is required to use both hands to start the press and to keep the press going during its downward travel so that the operator cannot have his hands between the ram and table of the press when the press is running.

The above and other objects and features of the invention will be apparent to those skilled in the art to which this invention pertains from the following detailed description and the drawings, in which:

FIG. 16 is a graphical representation showing the time relationship between the input and output signals of the normally closed time delay element of FIG. 15;

In the following detailed description and the drawings, like reference characters indicate like parts.

Figure 1:
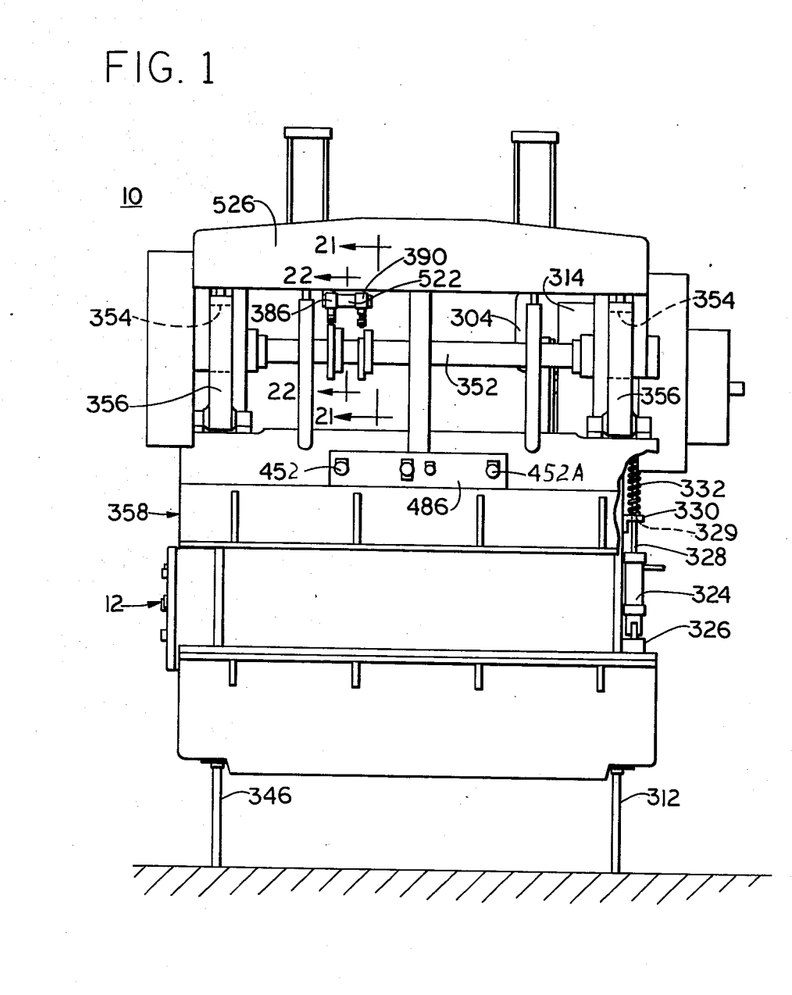
FIG. 1 is a front elevational view of a punch press upon which an embodiment of this invention is installed.

In FIG. 1 is shown a punch press 10 of the air clutch type that is fitted with a safety control system that is constructed in accordance with an embodiment of this invention. Air logic elements of the system are mounted in a control box 12. The safety control system is an air logic unit that utilizes air under pressure to penumatically control the punch press 10 in a pre-programmed manner. The air logic units are simple switching and low lever logic elements in combination to provide the desired result. The combination of elements form a program 14 or circuit, the circuit specific to this invention being shown in FIG. 3. The comprehension of the program 14 shown in FIG. 3 requires an understanding of the various air logic elements and their associated symbols. Since air logic systems are not common, a separate explanation of the major air logic elements and there associated symbols will be included next.

DESCRIPTION OF ELEMENTS

Figure 4:
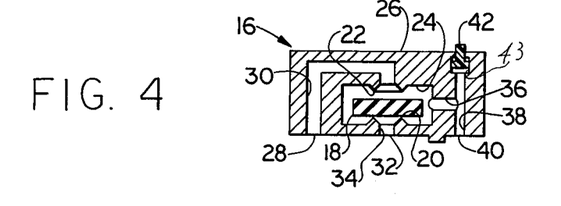
FIG. 4 is a schematic view in section showing internal parts of an "or" element of the pneumatic safety control system of FIG. 3.
Figure 5:
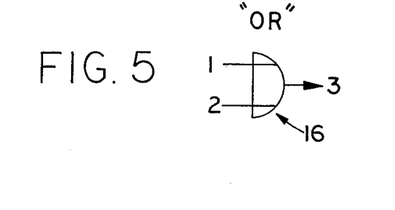
FIG. 5 is a symbolic representation of the "or" element of FIG. 4.

The element shown in FIG. 4 is known as an "or" element 16, and is comprised of a free poppet 18 that moves between a lower seat 20 and an upper seat 22, and within the confines of a plenum 24 within a body 26. An input port 28 communicates with a duct 30 and the upper seat 22. A second input port 32 communicates with a short duct 34 and the lower seat 20. An output duct 36 communicates between the plenum 24 and a standing duct 38 whose lower extremity is an output port 40 and whose upper extremity is fitted with a piston 42 which works in a socket 43 that communicates with the duct 38. When an input signal, high pressure air, enters the input port 28, it passes through the duct 30 and enters the plenum 24, driving the free poppet 18 away from the upper seat 22 and against the lower seat 20, effectively closing the second input port 32 which prevents venting of the input signal from the input port 28. Air leaves the plenum 24 by the output duct 36 and the standing duct 38 to provide an output signal at the output port 40. When an input signal is applied at the second input port 32 and not at the input port 28, high pressure air passes through the short duct 34 and into the plenum 24, driving the free poppet 18 away from the lower seat 20 and against the upper seat 22 which prevents venting of the input signal from the second input port 32 at the input port 28. Air again leaves the plenum 24 through the output duct 36 and the standing duct 38 to provide an output signal at the output port 40. In the case where two input signals of equal air pressure are entered into the input port 28 and the second input port 32 at the same time, the free poppet 18 will float within the plenum 24, thus providing an output signal at the output port 40. Consequently, air signals entered into the input port 28, the second input port 32, or both, will provide an output signal at the output port 40. The piston 42 will rise if there is pressure in the standing duct 38. If there is no pressure in the standing duct 38, the piston 42 will remain down after manual depression, which provides a method of locating elements that have malfunctioned. Referring to FIG. 5, the symbol infers that an input signal at 1 will pass through the element without interference to provide an output signal at 3, whether there is an input signal at 2 or not. Also, an input signal at 2 will pass through the element without interference to provide an output signal at 3 whether there is an input signal at 1 or not. Thus, the element is known as an "OR" element.

Figure 6:
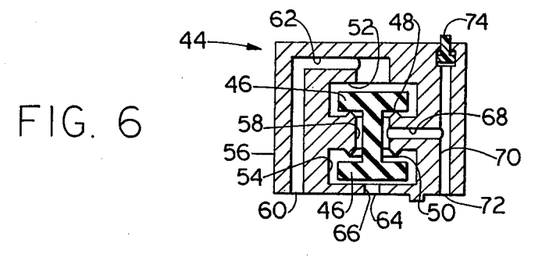
FIG. 6 is a schematic view in section showing internal parts of an "and" element of the pneumatic safety control system of FIG. 3.

The element shown in FIG. 6 is known as an "and" element 44, and is comprised of a free spool-shaped poppet 46 that moves between an upper seat 48 and a lower seat 50, and within the confines of an upper plenum 52 and a lower plenum 54 within a body 56. The upper plenum 52 and the lower plenum 54 communicate with each other by means of a central duct 58. An input port 60 communicates with a duct 62 and the upper plenum 52. A second input port 64 communicates with a short duct 66 and the lower plenum 54. An output duct 68 communicates between the central duct 58 and a standing duct 70 whose lower extremity is an output port 72, and whose upper exrtremity is fitted with a piston 74. When an input signal, high pressure air, enters the input port 60, it passes through the duct 62 and into the upper plenum 52, forcing the free poppet 46 down upon the upper seat 48, thus blocking the input signal at the input port 60 from proceeding further through the "and" element 44. When an input signal is applied to the second input 64 and not to the input port 60, air passes through the short duct 66 and into the lower plenum 54 where it forces the free poppet 46 upward against the lower seat 50 to likewise block the input signal from proceeding further through the "and" element 44. In the case where intput signals of equal pressure are applied to the input port 64 and the up input port 60 at the same time, then the free poppet 46 will float between the upper and lower seats 48 and 50, respectively, and in any case, will permit air to enter the central duct 58. Air leaves the central duct 58 by way of the output duct 68 and downwardly through the standing duct 70 to provide an air signal at the output port 72. The piston 74 will rise after manual depression if pressure is present within the standing duct 70, and thereby provides a convenient means of checking the system for a malfunction of an element.

Figure 7:
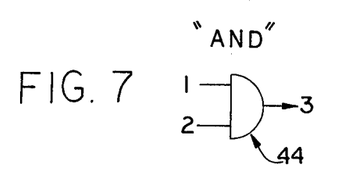
FIG. 7 is a symbolic representation of the "and" element of FIG. 6.

Referring to FIG. 7, the symbol infers that an input signal at 1 alone will not pass through the element, nor will an input signal at 2 alone. Input signals at 1 and 2 together will pass through the element to provide an output signal at 3. Thus the element is known as an "and" element because it requires input signals 1 and 2 to achieve output signal 3.

Figure 8:
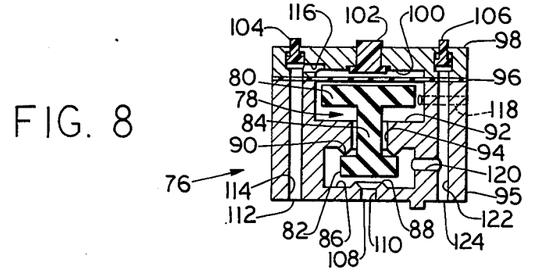
FIG. 8 is a schematic view in section showing the internal parts of a "not" element of the pneumatic safety control system of FIG. 3.

The element shown in FIG. 8 is a "not" element 76 that incorporates an unsymmetrical spool-shaped free poppet 78. The unsymmetrical free poppet 78 is comprised of a large upper disc 80 and a small lower disc 82 connected by a central shaft 84. The smaller lower disc 82 moves within the confines of a lower plenum 86 that incorporates a lower seat 88 and an upper seat 90. The larger upper disc 80 of the unsymmetrical free poppet 78 moves within the confines of an upper plenum 92. The upper and lower plenums 92 and 86, respectively, communicate with each other by means of a central duct 94, and are internal features of a body 95 of the "not" element 76. The upper extremity of the upper plenum 92 is closed and sealed by means of a diaphragm 96 and cap 98, the cap 98 being fixedly attached to the body 95 of the "not" element 76. The cap 98 incorporates an upper plenum extension 100, a manual override plunger 102, an input piston 104 and an output piston 106. A pressure port 108 is located at the bottom of the body 95 and communicates through a short duct 110 with the lower plenum 86. A switching port 112 communicates with a duct 114 that rises vertically through the body 95, the diaphragm 96, and into the cap 98. The upper extremity of the duct 114 is fitted with the input piston 104 which senses pressure therein. A lateral passage 116 communicates between the upper end of the duct 114 and the upper plenum extension 100. The upper plenum 92 of the body 95 is vented to the atmosphere by means of a vent duct 118. An output duct 120 communicates between the lower plenum 86 and a standing duct 122, the upper extremity of which passes through the diaphragm 96 and into the cap 98 to incorporate the output piston 106 for indicating the presence of pressure therein. The lower extremity of the standing duct 122 is an output port 124. When high pressure air is supplied to the pressure port 108, from either another element of the logic circuit or from an independent source, air enters the lower plenum 86 through the short duct 110 and forces the unsymmetrical free poppet 78 to rise against the upper seat 90, sealing the upper plenum 92 from the lower plenum 86. Air then passes from the lower plenum 86 through the output duct 120, through the lower portion of the standing duct 122 to the output port 124 to provide the output signal therefrom. When high pressure air enters the switching port 112, air passes through the duct 114 and the lateral passage 116 to pressurize the upper plenum extension 100. The diaphragm 96 distends downwardly against the large upper disc 80 of the unsymmetrical free poppet 78, pushing it downwardly until the small lower disc 82 rests solidly against the lower seat 88. Flow from the pressure port 108 is thereby shut off and the pressure that is stored in the output line will flow backward through the standing duct 122, the output duct 120, the lower plenum 86, the central duct 94, the upper plenum 92 and the vent duct 118 to be vented into the atmosphere. The manual override plunger 102 is utilized in error analysis.

Figure 9:
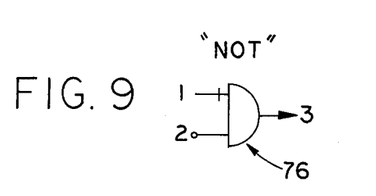
FIG. 9 is a symbolic representation of the "not" element of FIG. 8.

Referring to FIG. 9, the symbol infers that a signal is continuously applied to the "not" element 76 at 2. The numeral 2 indicates that the signal can come from another element in the logic network. The signal can come from an independent source external to the previous logic. In either case, the signal applied at 2 passes through the "not" element 76 to provide an output at 3, until a positive signal is applied at 1, in which case, the output at 3 is cut off. The "not" element derives its name from the fact that when both input signals are applied, the signal at 2 does "NOT" pass, or is shut off.

Figure 10:
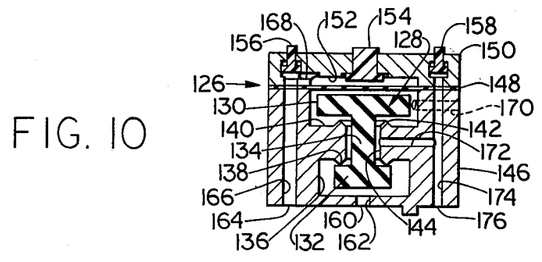
FIG. 10 is a schematic view in section showing the internal parts of a "yes" element of the pneumatic safety control system of FIG. 3.

The element shown in FIG. 10 is a "yes" element 126 that incorporates an unsymmetrical free poppet 128. The unsymmetrical free poppet 128 is comprised of a large upper disc 130 and a small lower disc 132 connected by a central shaft 134. The small lower disc 132 moves within the confines of a lower plenum 136 that incorporates an inverted lower seat 138. The larger upper disc 130 moves within the confines of an upper plenum 140 that incorporates an upper seat 142. The upper and lower plenums 140 and 136, respectively, communicate with each other by means of a central duct 144, and the internal features of a body 146 of the "yes" element 126. The upper extremity of the upper plenum 140 is closed and sealed by means of a diaphragm 148 and a cap 150, the cap being fixedly attached to the body 146 of the "yes" element 126. The cap 150 incorporates a top plenum 152, a manual override plunger 154, an input piston 156 and an output piston 158. A pressure port 160 is located at the bottom of the body 146 and communicates with a short duct 162 and the lower plenum 136. A switching port 164 communicates with a duct 166 that rises vertically through the body 146, the diaphragm 148 and into the cap 150. The upper extremity of the duct 166 is fitted with the input piston 156 which senses pressure therein. A lateral passage 168 communicates between the upper end of the duct 166 and the top plenum 152. The upper plenum 140 is vented to the atmosphere by means of a vent duct 170. An output duct 172 communicates between the central duct 144 and a standing duct 174, the upper extremity of which passes through the diaphragm 148 and into the cap 150 to incorporate the output piston 158 for indicating the presence of pressure therein. The lower extremity of the standing duct 174 is an output port 176. When high pressure air is supplied to the pressure port 160, from either another element of the logic circuit or from an independent source, air enters the lower plenum 136 through the short duct 162 and forces the unsymmetrical free poppet 128 to rise against the inverted lower seat 138 sealing the upper plenum 140 and the output duct 172 from the lower plenum 136. In this manner, the pressure port 160 remains shut off within the "yes" element 126, and the signal does not pass. When high pressure air enters the switching port 164, air passes through the duct 166 and the lateral passage 168 to pressurize the top plenum 152. The diaphragm 148 distends downwardly against the larger upper disc 130 of the unsymmetrical free poppet 128, pushing it downward until the undersurface of the large upper disc 130 rests firmly against the upper seat 142, and the upper surface of the small lower disc is spaced from the inverted lower seat 138. The signal or pressure that is present within the lower plenum 136 is now free to pass into the central duct 144 but not into the upper plenum 140. From the central duct 144, the air passes into the output duct 172, into the standing duct 174 and out the output port 176. The output piston 158 can be pushed to check to see if pressure exists in the output line of the "yes" element 126. The pressure port 160 signal is thereby passed through the element upon application of a signal or pressure at the switching port 164. When the signal at the switching port 164 is terminated, the unsymmetrical free poppet 128 will again rise to its former position against the inverter lower seat 138, and the output line pressure will vent to atmosphere by reverse flow through the standing duct 174, the output duct 172, the central duct 144, the upper plenum 140 and the vent duct 170. The manual override plunger 154 is utilized in error analysis.

Figure 11:
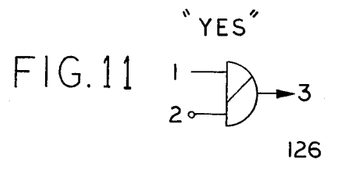
FIG. 11 is a symbolic representation of the "yes" element shown in FIG. 10.

Referring to FIG. 11, the symbol infers that a signal is continuously applied to the "yes" element 126 at 2. The numeral 2 indicates the same air sources as has been previously described. The applied signal at 2 does not pass through the "yes" element 126 until a pressure signal is received at 1, which switches 2 to a through position and thereby providing a output signal at 3. The "yes" element 126 gets its name from the fact that it is normally off, until a switch signal says "yes" and provides an output signal.

Figure 12:
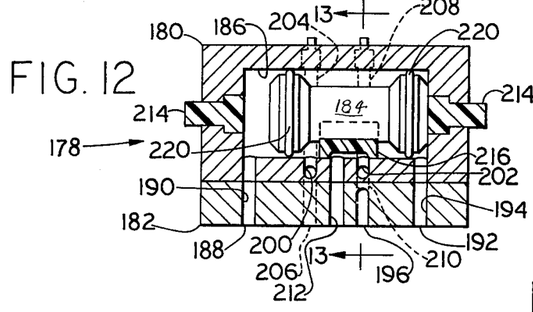
FIG. 12 is a schematic view in section showing the internal parts of a "flip-flop" element of the pneumatic safety control system of FIG. 3.
Figure 13:
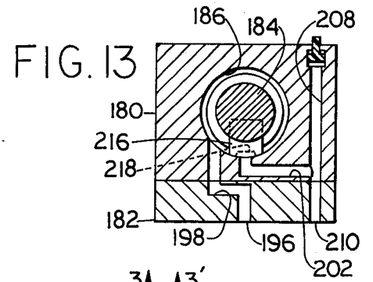
FIG. 13 is a view taken in section on the line 13—13 in FIG. 12.

A "flip-flop" element 178 is shown in FIG. 12 and includes main body 180 and a lower body 182. Internal of the main body 180 is a spool 184, the ends of which perform as pistons within a bore 186. A left side switch input port 188, communicates with a left side duct 190 that rises vertically through the lower body 182 and the main body 180 to enter the bore 186 at the bottom and left end thereof. Similarly, a right side switch input port 192 communicates with a right side duct 194 that rises vertically through the lower body 182 and the main body 180 to enter the bore 186 at the bottom and right end thereof. Referring now to FIG. 13, a pressure port 196, located at the center of the lower body 182, communicates with a pressure duct 198 that rises in an offset manner through the lower body 182, and vertically through the main body 180 to enter the central portion of the bore 186. Referring now to both FIGS. 12 and 13, the central portion of the bore 186 communicates with a left hand output duct 200 and a right hand output duct 202, both of which descend vertically from the bottom of the bore 186 into the main body 180, then laterally to the right when viewing FIG. 13. The left hand output duct 200 communicates with a left hand standing duct 204 (FIG. 12), the lower extremity of which communicates with a left hand output port 206. The right hand output duct 202 communicates with a right hand standing duct 208, the lower extremity of which communicates with a right hand output port 210. The center of the bore 186 communicates with an air vent 212 that passes vertically downward from the bottom of the bore 186, passing through the main body 180 and the lower body 182. The main body 180 incorporates at each end, a plunger 214, to manually push against the ends of the spool 184. The central portion of the spool 184 incorporates a switch plug 216, fixedly attached thereto, that runs in a sealed manner against the bottom of the bore 186. The switch plug 216 incorporates a slot 218 that spans the width of either the left hand output duct 200 and the vent 212, or the right hand output duct 202 and the vent 212. Therefore, if high pressure air is applied to the left side switch input port 188, it will flow through the left side duct 190 and pressurize the left end of the bore 186, driving the spool 184 and associated switch plug 216 to the right as shown in FIG. 12. At this point, if the air pressure is terminated to the left side input port 188, the spool 184 will remain in place as before. When the pressure port 196 is under pressure, air will flow through the pressure duct 198 and fill that portion of the bore 186 between a pair of seals 220 located approximate the ends of the spool 184. Clear passage is thereby provided to the left hand output duct 200, which in turn pressurizes the left hand standing duct 204 and the left hand output port 206. At the same time, any stored pressure in the right hand output line, will flow backward the right hand output port 210, through the right hand output duct 202, into the slot 218 of the switch plug 216, and out the vent 212 to the atmosphere. In time, high pressure air will be applied to the right side switch input port 192, and will flow through the right side duct 194 to pressurize the right end of the bore 186, thus driving the spool 184 all the way to the left within the bore 186. In this position, the switch plug 216 and the slot 218 couple the left hand output duct 200 and the vent 212 to depressurize the left hand output port 206, and at the same time forms a clear path between the pressure duct 198, and the right hand output duct 202 to provide an output signal at the right hand output port 210.

Figure 14:
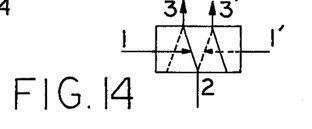
FIG. 14 is a symbolic representation of the flip-flop element shown in FIGS. 12 and 13.

Referring now to FIG. 14, the symbol infers that with a signal constantly applied to the port 2, the output can be switched from 3' to 3 by the application of a signal at 1, and, similarly, the output can be switched from 3 back to 3' by the application of a signal at 1'. If no signal is applied to 1 or 1', the output will correspond to the last input signal and will remain so until a new input signal is applied. If signals are applied to both 1 and 1' at the same time, the spool 184 will not respond and the output will remain unchanged.

Figure 15:
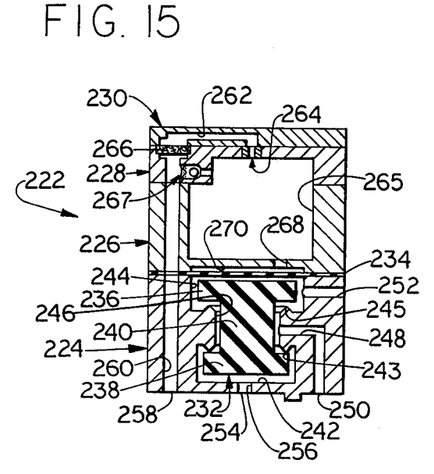
FIG. 15 is a schematic view in section of a normally closed time delay element of the pneumatic safety control system of FIG. 3.

The element shown in FIG. 15 is known as a normally closed time delay 222. The normally closed time delay is comprised of a poppet body 224, a reservoir body 226, a nozzle body 228, a cap 230, an unsymmetrical free poppet 232, and a diaphragm 234. The unsymmetrical free poppet 232 is comprised of a large upper disc 236, and a smaller lower disc 238 that are joined together by a central shaft 240. The small lower disc 238 moves within the confines of a lower plenum 242 that incorporates an inverted lower seat 243. The large upper disc 236 moves within the confines of an upper plenum 244 that incorporates an upper seat 245. The upper and lower plenums 244 and 242 respectively are joined by a center bore 246. The upper extremity of the upper plenum 244 is closed and sealed by the diaphragm 234. The diaphragm 234 is compressively held between the reservoir body 226 and the poppet body 224. The cap 230, the nozzle body 228, and the reservoir body 226 are all fixedly attached to the poppet body 224. An output duct 248 communicates between the center bore and an output port 250. A vent 252 communicates between the upper plenum 244 and the atmosphere. A pressure port 254 communicates with the lower plenum 242 by means of a short duct 256. An input port 258 communicates with a duct 260 that rises vertically through the poppet body 224, the diaphragm 234, the reservoir body 226, the nozzle body 228, and into the cap 230. A cap duct 262 communicates between the upper extremity of the duct 260 and a nozzle 264, that in turn communicates with a timing plenum 265. Compressively held between the cap 230 and the nozzle body 228 is a filter 266. A small ball check valve 267 is incorporated within the nozzle body 228 and communicates between the upper portion of the duct 260 and the timing plenum 265 as shown in FIG. 15. A coupling duct 268 communicates between the timing reservoir 265 and a diaphragm plenum 270. Under normal use, high pressure air is applied at the pressure port 254 that in turn pressurizes the lower plenum 242 and forces the unsymmetrical free poppet 232 to seal against the inverted lower seat 243, thus preventing any signal from being applied at the output port 250. Upon the application of high pressure air at the input port 258, air flows up the duct 260, through the filter 266, through the cap duct 262, and through the nozzle 264. This is so because the small ball check valve will not permit flow into the timing plenum 265. After a short period of time that is determined by the size of orifice in the nozzle 264, the timing plenum 265 and the diaphragm plenum 270 will come up to pressure, distending the diaphragm 234 against the larger upper disc 236 of the unsymmetrical free poppet 232, and driving it downward. The unsymmetrical free poppet 232 is forced against the upper seat 245 to permit the pressure port 254 signal to be transmitted through the center bore 246, through the output duct 248, to the output port 250. This is graphically presented in FIG. 16, where the input pressure is applied at the input port 258 in FIG. 15 at a time $T_1$ and the output pressure remains at zero. The output signal is represented by the dashed line in FIG. 16. After a time $\Delta T$, the timing plenum reaches the relay pressure of the diaphragm, and the full output pressure is realized at time $T_2$. Referring again to FIG. 15, the output signal will remain as long as the input signal remains. When pressure is released from the input port 258, air rapidly exits the diaphragm and timing plenums 270 and 265, respectively, by way of the ball check valve 267 and the duct 260. With the diaphragm pressure released, the unsymmetrical free poppet 232 rapidly moves upward to close the lower plenum 242 against the pressure port 254 input and to open the output port to atmosphere. Therefore, stored pressure in the output line will flow backwards through the output port 250, the output duct 248, the center bore 246, the upper plenum 244, the vent 252 to the atmosphere.

Figure 17:
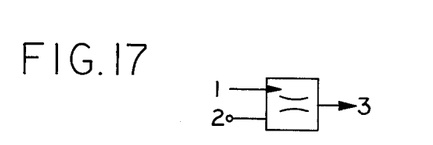
FIG. 17 is a symbolic representation of the normally closed time delay element shown in FIG. 15.

The symbol shown in FIG. 17 infers that a pressure signal is present at 2. When an input signal is applied at 1, the signal is delayed for a time ΔT according to FIG. 16. The poppet 232 of the normally closed time delay rapidly opens to permit the pressure present at 2 to pass through the element and supply a signal at 3.

Figure 18:
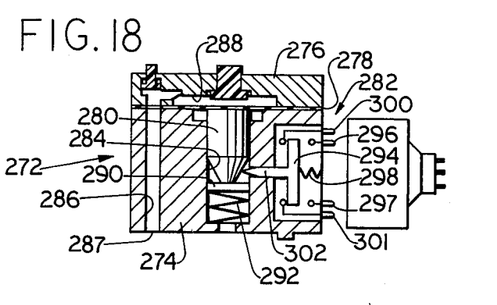
FIG. 18 is a schematic view in section of a pressure switch element of the pneumatic safety control system of FIG. 3.

The element shown in FIG. 18 is a pressure actuated switch 272. It includes a body 274, a cap 276, a diaphragm 278, a plunger 280 having a conical head, and a micro switch 282. The body 274 incorporates a central bore 284, that is vented at the bottom and an input duct 286 having an input port 287. The micro switch 282 is mounted in the body 272. The diaphragm 278 is fixedly clamped between the body 274 and the cap 276. The input duct 286 passes vertically through the body 274, the diaphragm 278, and into the cap 276 where it communicates with a diaphragm plenum 288. Applying high pressure air to the input duct 286 will directly pressurize the diaphragm plenum 288, which will distend the diaphragm 278 downward. The diaphragm 278 moves the plunger 280 downward against a washer 290 and a spring 292. The plunger moves a switch bar 294 to the right to make contact with a pair of leads 296 and 297. The leads 296 and 297 make whatever electrical circuit that is needed. Upon release of the input pressure in the input duct 286 and the diaphragm plenum 288, the spring 292 returns the conical plunger 280 upward and in contact with the diaphragm 278. In similar manner, a switch spring 298 returns the switch bar 294 from the pair of leads 296 to a pair of rest leads 300 and 301 that are so called because they are not used in this application. The stem 302 of the switch bar 294 remains in contact with the concial plunger 230. This pressure actuated micro switch 272 is so constructed with mechanical returns to provide that in the event of a pressure failure, the electrical connection will fail safe, i.e., off.

Figure 19:
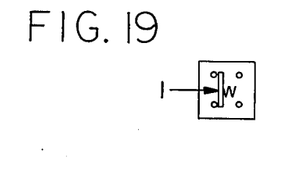
FIG. 19 is a symbolic representation of the pressure switch element of FIG. 18.

The symbol in FIG. 19 infers that a pressure signal at 1 is necessary to drive the electrical switch to the "on" position, and that the absence of same will reset the switch to off.

DESCRIPTION OF THE PUNCH PRESS

Figure 2:
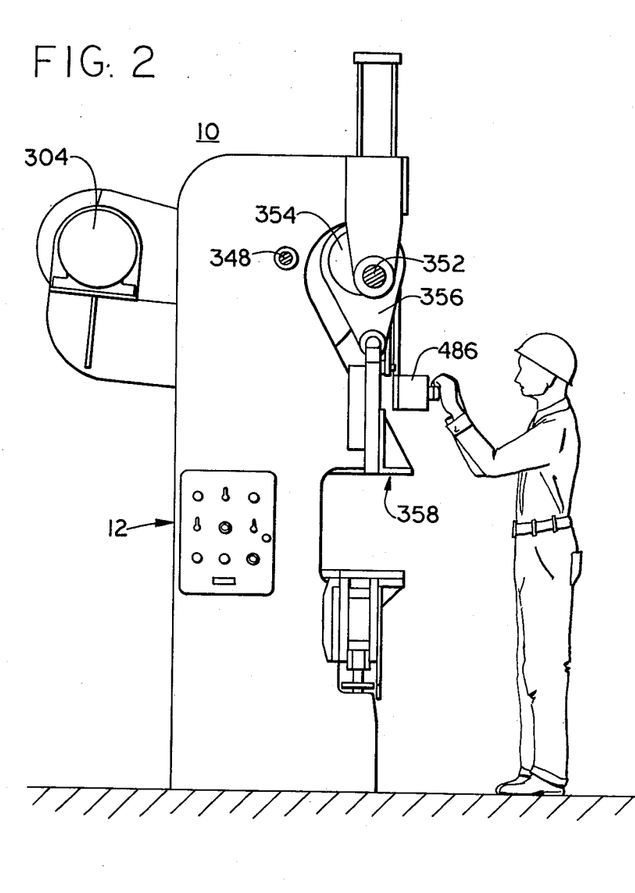
FIG. 2 is a side elevational view of the punch press illustrated in FIG. 1 showing the physical relationship of an operator to operating parts of the press.
Figure 20:
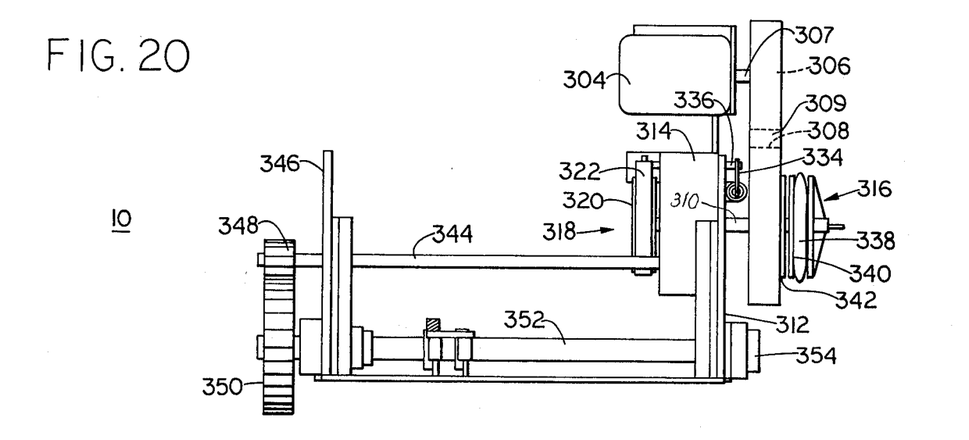
FIG. 20 is a plan view of the punch press shown in FIGS. 1 and 2, guards being removed to reveal structural detail.

Referring to FIGS. 1, 2, and 20, the punch press 10 is powered by a motor 304. A belt sheave 306, shown specifically in FIG. 20, is fixedly attached to a motor shaft 307 and transfers power to a drive sheave 308 by means of a drive belt 309. The drive sheave 308 is rotatably mounted upon a clutch shaft 310, that is in turn rotatably mounted through a right hand upright frame 312 of the punch press 10 and into a reduction gear box 314. The reduction gear box 314 is fixedly mounted to the upper inboard surface of the right hand upright frame 312. The drive sheave 308 is selectively coupled to the clutch shaft 310 by a pneumatic clutch 316 that is fixedly mounted to the outboard end of the clutch shaft 310. The inboard extremity of the clutch shaft 310 extends through the reduction gear box 314 and incorporates a brake 318. The brake 318 is comprised of a drum 320 and a band 322. Referring now to FIG. 1, a brake cylinder 324 is pivotally mounted to a cylinder mount 326 that is in turn rigidly affixed to the outboard surface of the right hand upright frame 312 of the punch press 10. A cylinder rod 328 extends upwardly through an opening 329 in a spring stop 330 and a compression spring 322 to be pivotally attached at its upper end to a brake lever 334 as shown in FIG. 20. The spring stop 330 is mounted on the upright frame 312 as shown in FIG. 1. The brake lever 334 (FIG. 20) is rigidly affixed to a brake cam shaft 336 that extends through the reduction gear box 314. The inborad extremity of the brake cam shaft 336 rigidly incorporates a brake cam (not shown) that cooperates with the band 322 so that when the moveable element of the brake cylinder 324 is retracted, the brake lever 334 and the brake cam will rotate to loosen the band 322 about the drum 320, thereby permitting the clutch shaft 310 to rotate. Whenever the brake 318 is released, the clutch 316 is simultaneously engaged by applying air pressure to a bladder 338 that in turn forces a clutch faces 340 into contact with a clutch plate 342 that is in turn rigidly affixed to the drive sheave 308. In this manner, application of air pressure releases the brake 318 and engages the pneumatic clutch 316 to permit the punch press 10 to operate. Whenever air pressure is interrupted, the compression spring 332 will set the brake 318 and the clutch face 340 will retract, thereby disengaging the motor 304 and stopping the clutch shaft 310.

The reduction gear box 314 transmits torque to a transfer shaft 344 (FIG. 20) that extends from the reduction gear box 314 across the punch press 10 and is bearinged in and extends through a left hand upright frame 346. The left extremity of the transfer shaft 344 rigidly incorporates a small gear 348. The small gear 348 cooperates with a large gear 350 that is rigidly affixed to the left extremity of a cam shaft 352. The cam shaft 352 is rotatably mounted through the left and right hand upright frames 346 and 312, respectively. Rigidly and eccentrically mounted on the cam shaft 352 is a pair of circular cams 354 as can be seen in FIGS. 1 and 2. The pair of circular cam 354 slidably rotate within the confines of a pair of lobes 356 that are in turn pinned to each end of a sliding ram 358 of the punch press 10. Therefore, the cam shaft 352 rotates the pair of circular cams 354 to drive the sliding ram 358 upwards and downwards. As can be seen, if the punch press 10 is operated with a simple on/off switch, it can be quite dangerous to the operator, especially under conditions of repetitivly inserting and removing parts from under the sliding ram 358 in coordination with the cyclic timing of the machine. If this timing should become inverted in the operator's mind, it is likely that he will be maimed. Also, controlling the press to stop at desired locations is difficult. The air logic safety control circuit shown in FIG. 3 makes it almost impossible for the operator to be injured.

AIR LOGIC SAFETY CONTROL PROGRAM

Figure 3:
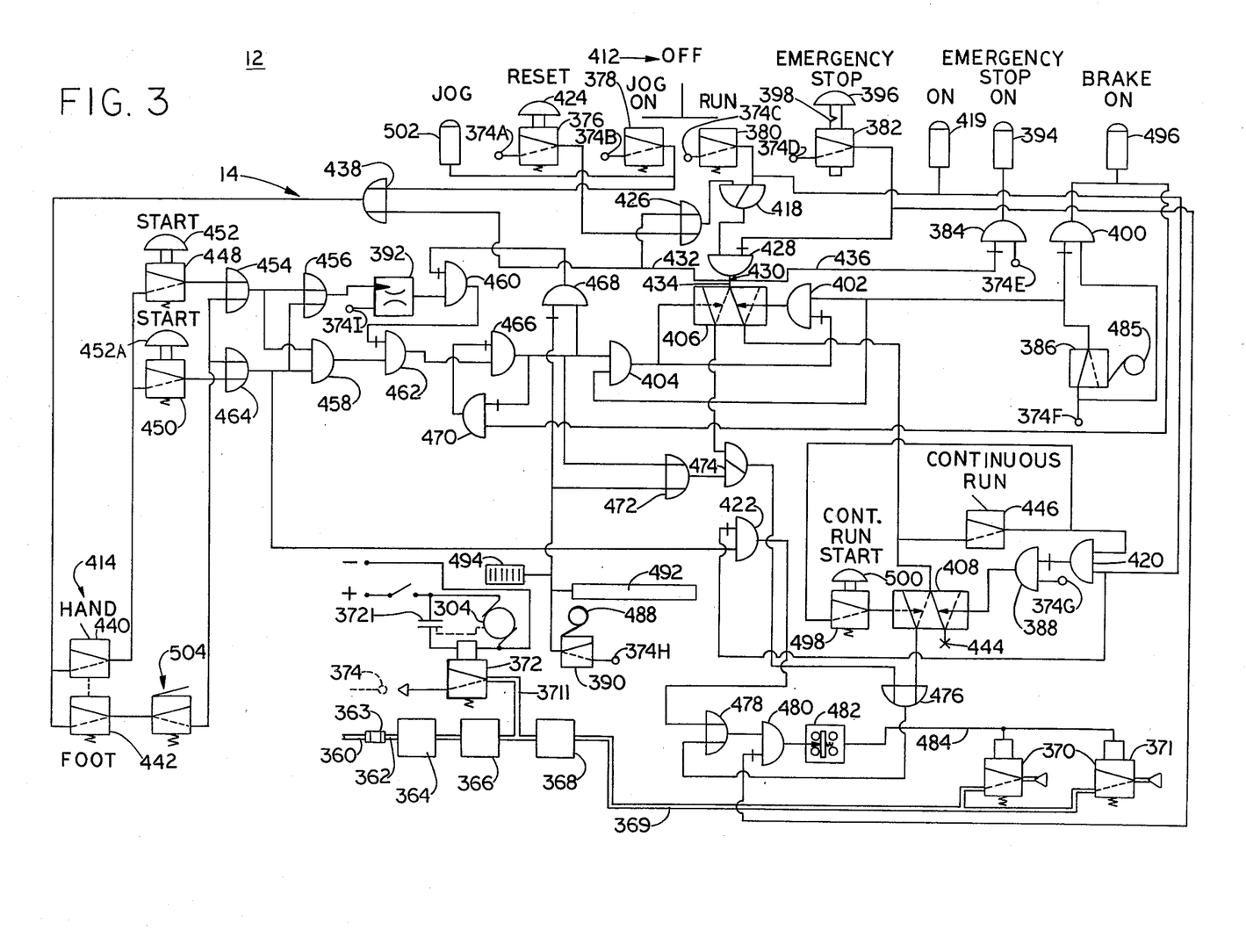
FIG. 3 is a circuit diagram of a pneumatic safety control system for the punch press.

The pneumatic control system or program 14 of the safety control system 12 is schematically shown in FIG. 3. To prepare the punch press 10 for operation, power must be available to the motor 304, and shop air pressure must be available in a shop air line 360. The shop air line 360 is connected to a main air line 362 by an appropriate connector fitting 363. The main air line 362 supplies air in series to a filter 364, a regulator 366, a lubricator 368, and a line 369 which supplies a pair of main solenoid valves 370 and 371. Air is also taken through a line 3711 downstream of the regulator 366, but upstream of the lubricator 368, and is directed to an electrically operated solenoid valve 372. The solenoid valve 372 is electrically wired to be actuated when the motor 304 is energized. Contacts 3721 of a motor relay energize the solenoid valve 372. The solenoid valve 372 supplies high pressure air, when open, to a plurality of pressure ports 374 throughout the safety control system 12, as indicated by the line and circle shown in dashed line in conjunction with the solenoid valve 372 of FIG. 3.

When the motor 304 is started, the solenoid valve 372 is opened, and high pressure air enters the plurality of pressure ports 374. The plurality of pressure ports 374 is comprised of a pressure port 374A of a reset switch 376, a pressure port 374B of a jog switch 378, a pressure port 374C of a run switch 380, a pressure port 374D of an emergency stop switch 382, a pressure port 374E of a not element 384, a pressure port 374F of a brake cam switch 386, a pressure port 374G of a not element 388, a pressure port 374H of a full up or return stroke cam switch 390, and a pressure port 374I of a normally closed time delay element or timer 392. In the symbol of all the foregoing switches, and the solenoid valves as well, a pressure signal does not pass through the switch along the dotted line, but would pass along a solid line. The solid line, when unconnected to an input line, vents the output line.

The reset switch 376, the jog switch 378, the run switch 380, the emergency stop switch 382, the full up or return stroke cam switch 390, and the timer 392 are all normally off, i.e., the pressure port signal is prevented from passing through the element. The "not" element 384 would pass the signal of the pressure port 374E to an emergency stop indicator 394, that would indicate to the operator that the emergency stop circuit had been activated. He would then check or pull out the emergency stop button 396 to the closed position as shown in FIG. 3. The emergency stop button 396 incorporates a detent 398, so when an emergency stop procedure is initiated, it will remain active until the operator deliberately resets it. Air from the pressure port 374F is transmitted to the pressure port of a "not" element 400 and to the brake cam switch 386. The brake cam switch 386 is normally open and the signal is transmitted through the switch to the switching port of the "not" element 400, to the pressure port of a "not" element 402 and to one of the input ports of an "and" element 404. The signals of the switching and pressure ports of the "not" element 400 arrive simultaneously and therefore the "not" element 400 does not transmit a signal. The signal at the pressure port of the "not" element 402 passes through the element and into the right hand switching port of a flip-flop element 406. The flip-flop element 406 is then prepared to pass a signal from its pressure port, along the solid line to the right hand output port. The signal at the input port of the "and" element 404 does not pass through since the other input signal is not there. The signal at the pressure port 374G will pass through the "not" element 388 and enter the right hand switching port of a flip-flop element 408. The flip-flop element 408 is then prepared to pass a signal from its pressure port, along the solid line, to the right hand output port as indicated by the arrow. The program 14 has now been energized.

Figure 24:
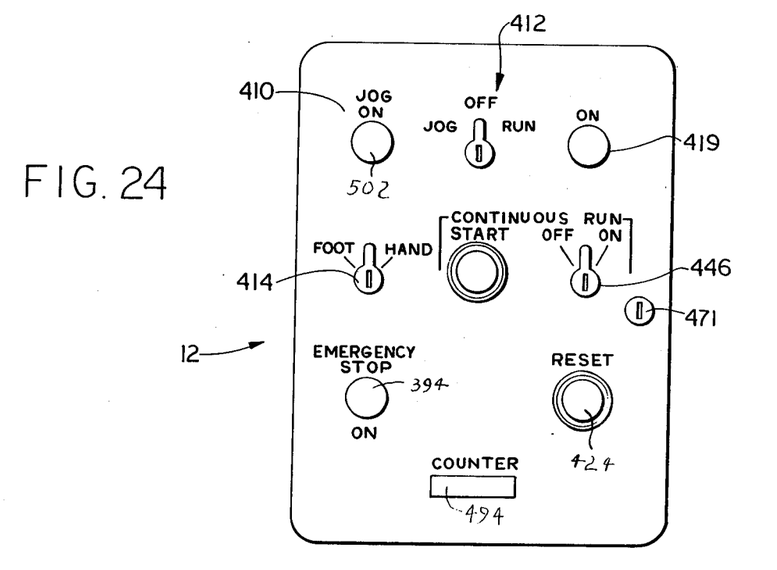
FIG. 24 is a front elevational view of a control box of the safety control unit.

To prepare the punch press 10 for operation by a workman, the supervisor must select the mode of operation by using three key switches on the control panel 410 of the control box 12 as is shown in FIG. 24. The three key switches are comprised of a "Jog-Off-Run" selector 412, a "Foot-Hand" selector 414, and a "continuous run off-on" selector 446. These three key switches are so constructed that the supervisor can remove the keys from any selected position and store them in a safe place. This prevents the workman or operator from changing the mode of the punch press 10 without the knowledge of the supervisor.

With the "Jog-Off-Run" selector 412 set in the "Run" position, and again reference being made to FIG. 3, the air pressure at the pressure port 374C will now pass through the run switch 380 to the pressure port of a "yes" element 418, to an "on" indicator 419, to one of the input ports of an "and" element 420, and to the switching port of a "not" element 422. As can be seen, the pressure signals will not pass through any of the three elements 418, 420 and 422, and the punch press 10 remains inoperative. A reset button 424 of the reset switch 376 must now be depressed, which permits air pressure at the pressure port 374A to pass through the reset switch 376, through an "or" element 426 and to the switching port of the "yes" element 418. The "yes" element 418 is caused to open, and air from the pressure port thereof passes through the element and to the pressure port of a "not" element 428. The signal passes through the "not" element 428 and into a three-way intersection 430. The three-way intersection 430 divides into a left hand branch 432, a central branch 434, and a right hand branch 436.

The pressure signal in the left hand branch 432 continues through an "or" element 438 to the pressure ports of a hand switch 440 and a foot switch 442 of the "Foot-Hand" selector 414, and also to the previously unused input port of the "or" element 426 where it passes through to the already pressurized switching port for the "yes" element 418. The purpose for this feedback loop is to lock the "yes" element 418 in the on position, so that the spring loaded reset button 424 of the reset switch 376 can now be released, eliminating the reset signal at the "or" element 426. At this point, the program 14 will retain its operating pressure signals, until pressure in the shop air line 360 is lost. A loss of pressure in the shop air line 360 means that an unplanned stop of the punch press 10 has occurred, the punch press 10 having halted at some odd and potentially dangerous position in its punch cycle. When pressure is restored in the shop air line 360, the punch press 10 is prevented from making an unannounced start because the "yes" element 418 does not have an input signal from either the reset switch 376 or the feedback signal from the "not" element 428, both of which pass through the "or" element 426. Renewing the working condition of the program 14 requires that the reset button 424 be deliberately pushed which, as previously explained, will once again open the "yes" element 418.

The signal in the central branch 434 of the three-way intersection 430 passes through the flip-flop element 406 and out its right hand output port, to and through the flip-flop element 408 and into a plug 444. It also pressurizes the input port of the "continuous run" switch 446.

The right hand branch 436 of the three-way intersection 430 supplies air pressure to the switching port of the "not" element 384 that shuts off the air from the pressure port 374E, thus terminating the on condition of the emergency stop indicator 394.

The final step in preparing the punch press 10 for operation in the run-hand mode is for the supervisor to open the hand switch 440 by means of the "Foot hand" selector 414 (FIG. 24) with the proper key. Thus air pressure flows through the hand switch 440 to the pressure ports of a start switch 448 and a start switch 450. The start switches 448 and 450 incorporate buttons 452 and 452A, respectively, that are spring loaded so that the switches are normally off or closed.

If the button 452 of the start switch 448 is depressed, high pressure air flows through the start switch 448 to an "or" element 454. From the "or" element 454 the signal flows to an "or" element 456 and an "and" element 458. The signal stops at the "and" element 458 but passes through the "or" element 456 to the timer 392. The timer 392 requires two tenths of a second to open the pressure port 374I to the output port of the element, subsequently delivering a pressure signal to a "not" element 460. The signal passes through the "not" element 460 and into the switching port of a "not" element 462 where it stops. As can be seen, depression of only the push button 452 of the start switch 448 will not activate the punch press 10.

A similar thing happens when only the start switch 450 is opened. A pressure signal is delivered through an "or" element 464 and then divides into three branches. First, the signal is delivered to the "and" element 458 where it stops. A second branch delivers the signal to the "not" element 422 where it is terminated by virtue of the switching port pressure within the element, that is, held there by the run switch 380. The third branch delivers the output signal from the "or" element 464 to the "or" element 456 where it passes through to the timer 392. After two tenths of a second, the timer 392 opens the element so that the pressure available within the pressure port 374I passes through the element to the pressure port of the "not" element 460. Here the signal is passed through to the switching port of the "not" element 462 where it is terminated. Again, the program 14 will not start the punch press 10.

If the start switches 448 and 450 are depressed within two tenths of a second of each other, both required input signals will be present at the "and" element 458, thus providing an output signal that passes through the "not" element 462, a "not" element 466, a "not" element 468 and into the switching port of the "not" element 460 to lock out the output signal of the timer 392 when it opens. The output signal of the "not" element 466 enters the switching port of a "not" element 470 where it is terminated. This will interrupt any stop signal that will be given from the "not" element 400 as soon as the machine begins to run. This will be explained more fully hereinafter. The output signal of the "not" element 466 is also transmitted to an "or" element 472 through which it passes to the switching port of a "yes" element 474 where it is terminated, but where it serves to open the "yes" element 474. Finally, the output signal of the "not" element 466 is transmitted to the previously unused input port of the "and" element 404, the other input port already being supplied by the brake cam switch 386, thus providing an output signal therefrom. The output signal of the "and" element 404 delivers two switching signal, one for the "not" element 402 which terminates the right hand switching port signal of the flip-flop element 406, and the other for the left hand switching port of the flip-flop element 406. The application of pressure at the left hand switching port of the flip flop element 406 drives its internal spool to the right, causing the input pressure to switch to the left hand output port as indicated by the dashed arrow. The left hand output port of the flip-flop element 406 then provides an output signal to the "yes" element 474, which is open as previously explained. The signal consequently passes through the "yes" element 474, an "or" element 476, and "or" element 478, a "not" element 480 and into the pressure port of a pressure actuated switch 482. The pressure actuated switch 482 makes an electrical circuit 484 (only a portion of which is shown) that opens the pair of main solenoid valves 370 and 371. Air pressure from the main air line 362 is thereby delivered to the brake cylinder 324 and the bladder 338 of the pneumatic clutch 316 indicated by the triangles at the output ports of the pair of main solenoid valves 370 and 371 in FIG. 3. The punch press 10 has now received all start commands for the "Run-Hand" mode, and mode, and motion will ensue.

The main solenoid valves 370 and 371 can be connected in parallel so that when one valve fails, it vents the main air line 362 to the atmosphere, sufficiently dropping the pressure in the brake cylinder 324 and the bladder 338 of the pneumatic clutch 316 to disengage the clutch and set the brake, thereby stopping the punch press 10 in a "fail safe" condition.

As soon as the cam shaft 352 of the punch press 10 (FIGS. 1, 2 and 22) rotates off top dead center, a brake cam 485 closes the brake cam switch 386 to interrupt the pressure signal from the pressure port 374F. This deactivates the "not" element 402 and the output ability of the "and" element 404, placing the flip-flop element 406 in a memory situation until the press is about to stop at the end of the cycle. Consequently, the left hand output port of the flip-flop element 406 remains under pressure until the flip-flop 406 is switched back to the right hand port very near the end of the cycle. The mechanical function of the brake cam 485 will be described hereinafter.

If either one of the start switches 448 or 450 is released before the press is full down, the output signal of the "and" element 458 will terminate, which also releases the switching port pressure of the "yes" element 474 and thereby terminates the run signal from the flip-flop 406. Since the switching signal of the "not" element 460 has also been eliminated, the output of the timer 392 will now pass through the "not" element 460 and into the switching port of the "not" element 462. The "not" element 462 now being closed will prevent a restart of the punch press 10 by repushing the start switch that had just been released, requiring both start switches 448 and 450 to be released to reset the timer 392. Also, the switching port pressure of the "not" element 470 has been lost, permitting the output from the "not" element 400 to pass through it to the switching port of the "not" element 466. This will lock out any new start signals of any kind, making it impossible for the workman to restart the press. The supervisor must be notified. The supervisor inserts a key in switch 412 (FIG. 24) to change the mode to jog position. At this time the supervisor jogs the press to the top position by hand and turns switch 412 back to run position. This resets the system to activate again upon depression of start switches 448 an 450 by the operator.

Figure 23:
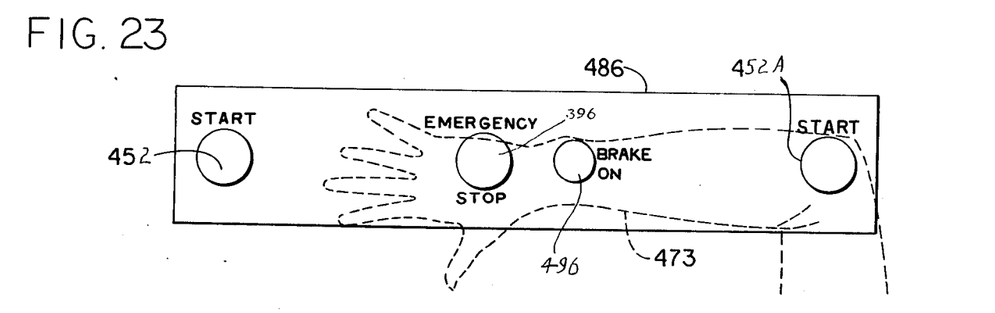
FIG. 23 is a front elevation view of a hand control box of the pneumatic safety control system of FIG. 2, an operator's arm being shown in association therewith.

As can be seen in FIGS. 1, 2 and 23, the push buttons 452 and 452A of the start switches 448 and 450 are located at opposite ends of a hand control box 486 that is in turn hung well above the working parts of the punch press 10. As is shown in FIG. 23, the start switches 448 and 450 are far enough apart to insure that both buttons cannot be pushed by the same hand, or for that matter, by a hand and elbow combination 473.

When the sliding ram 358 reaches full down, a "full up" or return stroke cam 488 (FIG. 21) opens the "full up" or return stroke cam switch 390 that permits air at pressure port 374H (FIG. 3) to pass through the "full up" cam switch 390 to an auto drain 492, a counter 494, the switching port of the "not" element 468, and the previously unused input port of the "or" element 472. The auto drain 492 eliminates condensation within the air logic system at each cycle. The counter successively adds full cycles of the punch press 10.

The presence of a pressure signal in the switching port of the "not" element 468 terminates the output signal thereof, which in turn releases the output signal of the timer 392 at the "not" element 460 through which it then passes to enter the switching port of the "not" element 462, thereby severing the run signal from the output port of the "and" element 458. With the run signal being eliminated, the switching port pressure of the "not" element 470 is likewise eliminated, permitting the pressure port signal thereof to pass into the switching port of the "not" element 466. This will stop any new start signals at the "not" element 466 until the output signal from the "not" element 400 of the brake cam switch 386 is terminated by the brake cam 485 near the end of the cycle. So a "continue" command, no matter how it is applied, cannot make the machine do a second cycle without stopping after the first cycle.

Pressure on the previously unused input port of the "or" element 472 will pass through that element and enter the switching port of the "yes" element 474, insuring that the run signal from the left hand output port of the flip-flop element 406 continues uninterrupted. The punch press 10 will continue to run until the cam switch 390 is closed by the "full up" cam 488 near the end of the cycle. The press will therefore come to a halt after one full cycle. A mechanical description of the "full up" cam 488 will be included hereinafter.

The program 14 is reset when the brake cam 485 again opens the brake cam switch 386 just before the punch press 10 comes to a full stop. This resets the flip-flop element 406 and eliminates the stop start signal in the "not" element 466.

As the punch press 10 is completing its cycle, and under conditions of a worn brake, the momentum of the press can carry the cam shaft 352 past top dead center, which means that the punch press 10 is beginning to close again. This can be particularly hazardous, and the purpose of the brake cam 485 and the brake cam switch 386 is to prevent the machine from starting again if it does not stop at top dead center. The brake cam switch 386 opens at top dead center and resets the flip-flop element 406 to the right hand output port thereof. If the machine overruns top dead center, the brake cam switch 386 closes, the "not" element 402 and the "and" element 404 will not be able to pass any output signals into the flip-flop element 406 and the output thereof remains at the right hand output port. The signal at the pressure port of the "not" element 400 will pass through the element to a "brake on" indicator 496 as well as to the "not" element 470 where it will pass due to the lack of a switching port signal. The signal then terminates in the switching port of the "not" element 466, thus rendering ineffective any start signals from the start switches 448 and 450. The "brake on" indicator 496 tells the operator the reason why the machine will not start.

At times, it is desirable for the punch press 10 to run continuously and, as was previously described, the safety control system 12 incorporates the "continuous run" switch 446. This key selector switch requires that the supervisor, and not the operator, change the mode of the machine from single cycle to continuous run. Referring to FIG. 3, it can be seen that the "Jog-On-Run" selector must be in the "Run" position, and the brake cam switch 386 open at top dead center. The input port pressure of the flip-flop element 406 will then pass through the element to its right hand output port, as indicated by the arrow from the "not" element 402. The output pressure is transmitted to the input ports of the "continuous run" switch 446 and the flip-flop element 408. Pressure from the pressure port 374G passes through the "not" element 388 and into the right hand switching port of the flip-flop element 408, requiring that the input signal pass through the flip-flop element 408 to its right hand output port and into the plug 444. When the "continuous run" switch 446 is opened, high pressure air passes through it to the previously unused input port of the "and" element 420, and to the input port of a "continuous run start" switch 498. The "continuous run start" switch 498 remains open only while a button 500 of the switch 498 is being manually depressed. The pressure signal arriving at the "and" element 420 passes through it to the switching port of the "not" element 388, and terminates the output signal thereof. The flip-flop 408 switches its input signal to the left hand output port when the button 500 is depressed. As the button 500 is released, the flip-flop element 408 is left in its memory mode, with the left hand output port active. The left hand output signal of the flip-flop element 408 passes through the "or" element 476, the "or" element 478, the "not" element 480 and into the pressure switch 482. The pressure switch 482 starts the punch press 10 as has been previously described. The punch press 10 will now run continuously until the emergency stop switch 382 is depressed, sending a pressure signal to the switching port of the "not" element 480 which terminates its output. To restart the press in this condition, the operator must pull out the emergency stop button 396 and depress the reset button 424 and start button 500.

If the workman wants to advance the punch press 10 in small increments to assist in setting up a new die, the "Jog-On-Run" selector 412 must again be changed with the proper key, requiring the assistance of the supervisor. With the jog switch 378 on, pressurized air from the pressure port 374B is transmitted to a jog indicator 502, and also to the "or" element 438. The output of the "or" element 438 pressurizes the input ports of the hand switch 440 and the foot switch 442. If the "foot-hand" selector is in the hand mode, then the hand switch 440 is open and air passes to the input ports of the start switches 448 and 450. Depression of the start switch 450 only will send a pressure signal through the "or" element 464 and directly to the "not" element 422, which is now open since the run switch 380 is closed. The signal therefore passes through the "not" element 422, the "or" element 478, the "not" element 480, and into the pressure switch 482. The electrical circuit 484 energizes the pair of main solenoid valves 370 and the punch press 10 starts. As the spring loaded button 452 of the start switch 450 is released, the punch press 10 will stop. Repeated starts and stops are normal in the jog mode.

If the "foot-hand" selector 414 is used to open the foot switch 442, then by necessity, the hand switch 440 will be closed. Air will pass through the foot switch 442 to a foot pedal switch 504 that is spring loaded. As the workman closes the foot pedal switch 504 a pressure signal is transmitted to the previously unused input ports of the "or" elements 454 and 464 through which it passes. In consequence, the foot pedal switch 504 achieves the same circuit response as has just been described for the start button 450 when the selector 412 is in jog-on position, and the punch press 10 will run until the foot pedal switch 504 is released. Pulsing the foot pedal switch 504 will also pulse the punch press 10, advancing the sliding ram 358 in small increments. When the selector 412 is in run position, actuation of the foot pedal switch 504 achieves the same circuit response as depressing the start buttons of the start switches 448 and 450 in unison.

Figure 21:
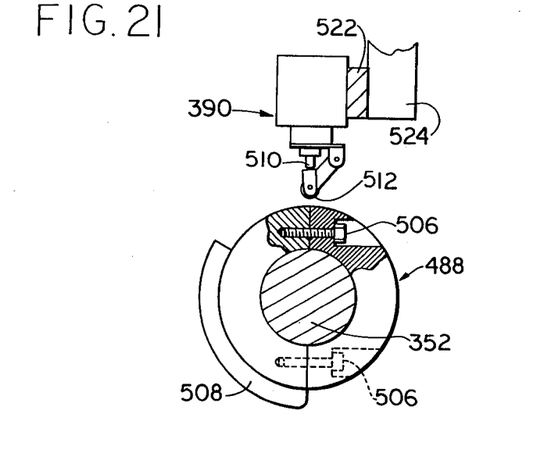
FIG. 21 is an enlarged view in section taken on the line 21—21 in FIG. 1.

Referring now to FIG. 21, the "full up" cam 488 is a severed ring, which is fixedly clamped to the cam shaft 352 by a pair of machine screws 506. The "full up" cam is shown in FIG. 21 with the punch press at its top dead center position. A lobe 508 integrally incorporated into the full up cam 488 begins at a point 180° clockwise from the top dead center point of the cam shaft 352 and ends at a point 300° from the top dead center. As the cam shaft 352 rotates counterclockwise, a plunger 510 of the full up cam switch 390 remains extended for the first 180° of rotation, during which time the sliding ram 358 has descended to its full down position. At this point the lobe 508 will come into contact with a switch roller 512 of the full up cam switch 390 depressing the plunger 510 and opening the full up cam switch 390. As previously explained, the start switches 448 and 450 are locked out and the punch press 10 will run continuously until the switch roller 512 runs off the lobe 508 at 300° of rotation of the cam shaft 352. The plunger 510, being spring loaded, will extend, closing the "full up" cam switch 390 and shutting off the punch press 10. Momentum in the punch press 10 will bring the press to its top dead center position during the time interval required to disengage the pneumatic clutch 316 and apply the brake to stop the machine with the brake 318.

Figure 22:
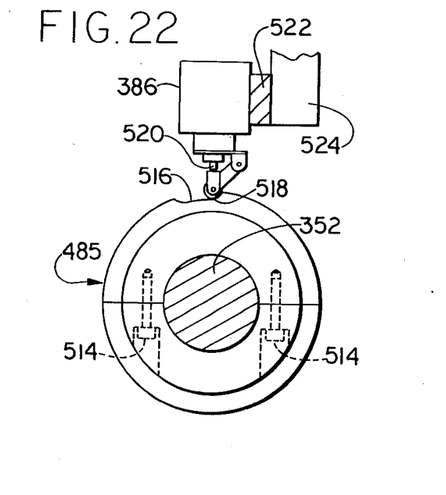
FIG. 22 is an enlarged view in section taken on the line 22—22 in FIG. 1.

As shown in FIG. 22, the brake cam 485 is a severed ring that is fixedly attached to the cam shaft 352 by means of the pair of machine screws 514. A depression 516 is provided in the outer circumference of the brake cam 485 whose circumferential length covers 25° of arc. When a switch roller 518 rests in the depression 516, a plunger 520 of the brake cam switch 386 is extended by spring pressure, and opens the pneumatic circuit of the brake cam switch 386 shown in FIG. 3, When the cam shaft 352 is at top dead center, as shown in FIG. 22, the depression 516 begins at 20° counterclockwise and ends at 5° of arc clockwise. At top dead center the switch roller 518 is still at the bottom of the depression 516, the plunger 520 is fully extended, and the brake cam switch 386 is open. As soon as the cam shaft 352 rotates 5° counterclockwise, the plunger 520 is fully depressed, closing the pneumatic circuit through the brake cam switch 386. The brake cam switch 386 remains closed until the cam shaft 352 has rotated some 345°, where the plunger 520 becomes fully extended again and subsequently opens the brake cam switch 386 again. The 15° of arc is necessary to provide for the response time of the pneumatic circuit.

Referring to FIGS. 1, 21 and 22, the full up cam switch 390 and the brake cam switch 385 are fixedly attached to a horizontal mount 522 at such lateral placement as to properly align them with the "full up" cam 488 and the brake cam 485, respectively. The horizontal mount 522 is rigidly affixed at its left hand end to a vertical hanger 524, that is in turn rigidly suspended from a header 526 of the punch press 10.

The pneumatic control system permits operation of the press by an operator whose hands must stay on the start buttons of the start switches 450 and 452 throughout the down stroke of the press when the machine is in the hand operated run mode. If one of the start switches is inadvertently released before completion of the down stroke of the press, the press is stopped and supervisory control is required before the operation of the press can be continued. If the start buttons are not both depressed within a two tenths of a second interval, the press does not start to operate, and both start switches must be released before another attempt is made to start the press. If the brake of the press wears so that the press does not stop at the full up position, the press remains inoperative until supervisory control is exercised. Changes in mode of press operation require supervisory control.

The pneumatic control system for a press illustrated in the drawings and described above is subject to the modification without departing from the spirit and scope of the appended claims.

Having described my invention, what I claim as new and desire to secure by letters patent is:

1. A pneumatic control system for a press which comprises a pair of start switches, means for supplying air under pressure to the start switches, an or element having one of its input ports connected to each start switch, an and element having one of its input ports connected to each start switch, a normally closed time delay element having its input port connected to an output port of the or element, a not element having its pressure port connected to an output port of the and element, means connected to the output port of the not element for actuating the press, and means connecting the output port of the normally closed time delay element to a switching port of the not element, whereby the press is actuated when both of the start switches are actuated with the time interval between actuation of the start switches being less than the time delay of the normally closed time delay element.

2. A pneumatic control system as in claim 1 wherein the means connecting the output port of the normally closed time delay element to the switching port of the not element includes a second not element, the pressure port of the second not element being connected to the outlet port of the normally closed time delay element, the output port of the second not element being connected to the switching port of the first not element, and the system includes means connecting the output port of the first not element to the switching port of the second not element, whereby actuation of the normally closed time delay element following actuation of both start switches within the time delay of the normally closed time delay element fails to provide pressure at the switching port of the first not element, and pressure at the outlet port of the first not element continues after actuation of the normally closed time delay element.

3. A pneumatic control system as in claim 2 wherein the means connecting the output port of the first not element to the switching port of the second not element includes a third not element, means connecting the output port of the third not element to the switching port of the second not element, and means connecting the pressure port of the third not element to the output port of the first not element, and the system includes a return stroke cam operated switch connected to the switching port of the third not element and return stroke cam means operating in timed relation with the press to actuate the return stroke cam operated switch when the press is on a return stroke to supply air under pressure to the switching port of the third not element so that the second not element prevents passage of pressure from the normally closed time delay element to the switching port of the first not element during the return stroke and means connected to the return stroke cam actuated switch for actuating the press so that the press operates on its return stroke after start switch release.

4. A pneumatic control system as in claim 1 which includes a flip-flop element, means for supplying air under pressure to the pressure port of the flip-flop element, means connected to an output port of the flip-flop element for actuating the press, a second and element, means connecting one of the input ports of the second and element to the output port of the not element, means connecting the output port of the second and element to one of the input ports of the flip-flop element to cause advance of the flip-flop element to the position in which said output port of the flip-flop element is connected to the pressure port of the flip-flop element to receive press actuating pressure, another not element, means connecting the output port of the other not element to the second input port of the flip-flop element, means connecting the switching port of the other not element to the first input port of the flip-flop element, a brake cam operated switch, a brake cam operating in timed relation to the press to close the brake cam operated switch when the press is away from a braked rest position, and means for connecting the brake cam operated switch to the other input port of the second and element and to the pressure port of the other not element, the other not element causing the flip-flop element to move to its other position to stop the press actuating pressure at said output port of the flip-flop element when pressure at the first input port of the flip-flop element is released and the brake cam is away from braked rest position.

5. A pneumatic control system as in claim 3 which includes a flip-flop element, means for supplying air under pressure to the pressure port of the flip-flop element, means connected to an output port of the flip-flop element for actuating the press, a second and element, means connecting one of the input ports of the second and element to the output port of the first not element, means connecting the output port of the second and element to one of the input ports of the flip-flop element to cause advance of the flip-flop element to the position in which said output port of the flip-flop element is connected to the pressure port of the flip-flop element to receive press actuating pressure, a fourth not element, means connecting the output port of the fourth not element to the second input port of the flip-flop element, means connecting the switching port of the fourth not element to the first input port of the flip-flop element, a brake cam operated switch, a brake cam operating in timed relation to the press to close the brake cam operated switch when the press is away from a braked rest position, and means for connecting the brake cam operated switch to the other input port of the second and element and to the pressure port of the fourth not element, the fourth not element causing the flip-flop element to move to its other position to stop the press actuating pressure at said output port of the flip-flop element when pressure at the first input port of the flip-flop element is released and the brake cam is away from braked rest position.

6. A pneumatic control system as in claim 1 wherein the means for supplying air under pressure to the start switches includes a run switch, a yes element, means connecting the run switch to the pressure port of the yes element, a reset switch, means for supplying air under pressure to the run switch and to the reset switch, another or element, means connecting the reset switch to one of the input ports of the other or element, means connecting the output port of the other or element to the switching port of the yes element, whereby actuation of the reset switch causes actuation of the yes element, means connecting the output port of the yes element to the start switches to supply air under pressure to the start switches, and means connecting the output port of the yes element to the other input port of the yes element to cause continued actuation of the yes element upon opening of the reset switch.

7. A pneumatic control system as in claim 4 wherein the means for supplying air under pressure to the start switches includes a run switch, a yes element, means connecting the run switch to the pressure port of the yes element, a reset switch, means for supplying air under pressure to the run switch and to the reset switch, another or element, means connecting the reset switch to one of the input ports of the other or element, means connecting the output port of the other or element to the switching port of the yes element, whereby actuation of the reset switch causes actuation of the yes element, means connecting the output port of the yes element to the start switches to supply air under pressure to the start switches, and means connecting the output port of the yes element to the other input port of the yes element to cause continued actuation of the yes element upon opening of the reset switch and the means for supplying air under pressure to the pressure port of the flip-flop element includes means connecting the output port of the yes element to the pressure port of the flip-flop element.

8. A pneumatic control system as in claim 5 wherein the means for connecting one of the input ports of the second and element to the output port of the first not element includes a fifth not element, means connecting the output port of the first not element to the pressure port of the fifth not element and means connecting the output port of the fifth not element to said one of the input ports of the second and element, and the system includes a sixth not element, means for supplying air under pressure to the pressure port of the sixth not element, means connecting the switching port of the sixth not element to the brake cam operated switch, a seventh not element, means connecting the output port of the sixth not element to the pressure port of the seventh not element, means connecting the output port of the seventh not element to the switching port of the fifth not element, and means connecting the output port of the fifth not element to the switching port of the seventh not element, the seventh not element preventing passsage of pressure through the fifth not element to the second and element and to the switching port of the fourth not element when one of the start switches opens during a down stroke of the press so that the fourth not element passes pressure to the second input port of the flip-flop element to cause actuation of the flip-flop element to stop the press actuating pressure at said output port of the flip-flop element.

9. A pneumatic control system as in claim 8 wherein the means connected to said output port of the flip-flop element for actuating the press includes a yes element, means connecting the pressure port of the yes element to said output port of the flip-flop element, means connected to the output port of the yes element for actuating the press, another or element, means connecting the output port of the fifth not element to one of the input ports of the other or element, means connecting the return stroke cam operated switch to the other input port of the other or element, and means connecting the output port of the other or element to the switching port of the yes element, whereby the yes element is actuated to pass pressure to the output port of the yes element by pressure from the fifth not element during the down stroke of the press and by pressure from the return stroke cam operated switch during the return stroke of the press.

10. A pneumatic control system for a press which comprises a pair of start switches, means for supplying air under pressure to the start switches, an or element having one of its input ports connected to each start switch, an and element having one of its input ports connected to each start switch, a time delay element connected to an output port of the or element, a not element having its pressure port connected to an output port of the and element, means connected to the output port of the not element for actuating the press, and means connecting the time delay element to a switching port of the not element, whereby the press is actuated when both of the start switches are actuated with the time interval between actuation of the start switches being less than the time delay of the normally closed time delay element.

* * * * *